(12) United States Patent
Esmark et al.

(10) Patent No.: US 7,359,169 B2
(45) Date of Patent: Apr. 15, 2008

(54) CIRCUIT FOR PROTECTING INTEGRATED CIRCUITS AGAINST ELECTROSTATIC DISCHARGES

(75) Inventors: Kai Esmark, Neuried (DE); Harald Gossner, Riemerling (DE); Wolfgang Stadler, München (DE); Martin Streibl, Petershausen (DE); Martin Wendel, Hohenbrunn (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/536,176

(22) PCT Filed: Nov. 24, 2003

(86) PCT No.: PCT/EP03/13179

§ 371 (c)(1),
(2), (4) Date: May 23, 2005

(87) PCT Pub. No.: WO2004/049536

PCT Pub. Date: Jun. 10, 2004

(65) Prior Publication Data

US 2006/0056121 A1    Mar. 16, 2006

(30) Foreign Application Priority Data

Nov. 26, 2002   (DE)   ................................ 102 55 130

(51) Int. Cl.
| | |
|---|---|
| *H02H 9/00* | (2006.01) |
| *H02H 9/08* | (2006.01) |
| *H02H 3/20* | (2006.01) |
| *H02H 9/04* | (2006.01) |
| *H02H 3/22* | (2006.01) |
| *H02H 1/00* | (2006.01) |
| *H02H 1/04* | (2006.01) |
| *H02H 9/06* | (2006.01) |
| *H01C 7/12* | (2006.01) |

(52) U.S. Cl. ......................... 361/56; 361/58; 361/91.1; 361/91.5; 361/93.9; 361/111; 361/118

(58) Field of Classification Search .................. 361/56
See application file for complete search history.

(56) References Cited

U.S. PATENT DOCUMENTS 5,311,391 A * 5/1994 Dungan et al. ............... 361/56

(Continued)

FOREIGN PATENT DOCUMENTS

DE        197 39 683 A1      3/1999

OTHER PUBLICATIONS

International Search Report from International Application No. PCT/EP03/13179.

*Primary Examiner*—Robert L. Deberadinis
*Assistant Examiner*—Dharti H Patel
(74) *Attorney, Agent, or Firm*—Brinks Hofer Gilson & Lione (57) ABSTRACT

A circuit is described that protects an integrated circuit from electrostatic discharges or electrical over-stress. The circuit arrangement has first and second protective elements connected in series between a connection of the integrated circuit and a supply voltage. When electrostatic discharges or electrical over-stress occurs, current flows through the conductive path formed through the first and second protective elements. A current path that contains a circuit element limits current through the first protective element is connected in parallel with the first protective element. The first protective element has blocking behavior when no electrostatic discharges or electrical over-stress occurs, a limited current flows through the current path and the second protective element.

29 Claims, 6 Drawing Sheets

U.S. PATENT DOCUMENTS

| | | | |
|---|---|---|---|
| 5,453,384 A * | 9/1995 | Chatterjee | 438/135 |
| 5,719,737 A | 2/1998 | Maloney | |
| 5,859,758 A | 1/1999 | Kim | |
| 6,078,204 A * | 6/2000 | Cooper et al. | 327/309 |
| 6,452,768 B1 | 9/2002 | Wilkening | |
| 6,556,398 B1 * | 4/2003 | Chen | 361/56 |
| 6,580,184 B2 * | 6/2003 | Song | 307/112 |
| 2004/0212936 A1 * | 10/2004 | Salling et al. | 361/56 |

* cited by examiner

CIRCUIT FOR PROTECTING INTEGRATED CIRCUITS AGAINST ELECTROSTATIC DISCHARGES

This application is the national stage application of international application number PCT/EP03/13179, filed on Nov. 24, 2003, which claims the benefit of priority to German Patent Application 102 55 130.8, filed on Nov. 26, 2002, incorporated herein by reference.

TECHNICAL FIELD

The present invention concerns a circuit arrangement to protect integrated circuits (ICs) from electrostatic discharges (ESD) or electrical over-stress (EOS). In particular, this circuit arrangement has an extended possible voltage range in normal operation of the integrated circuit compared with a traditional ESD protective circuit.

BACKGROUND

Protection from electrostatic discharges is almost indispensable for modern integrated circuits. For this purpose, such ICs include special protective circuits, which conduct electrostatic discharges which occur at an input of the circuit, for instance because of touching by a person, away to a supply voltage, for instance earth.

Figure 6:
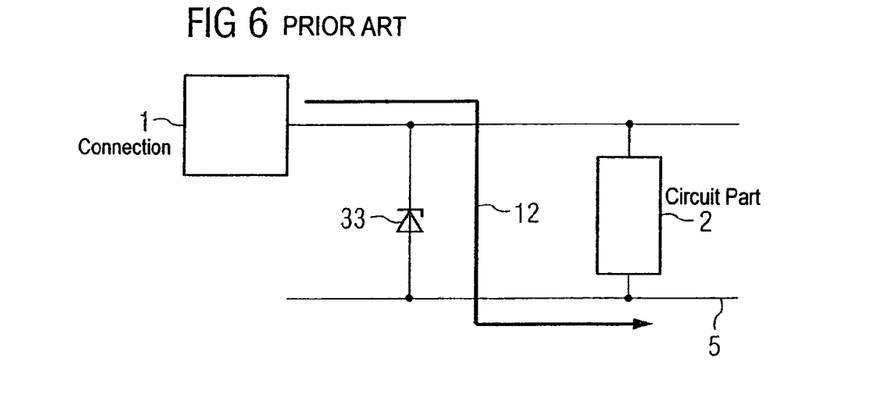
FIG. 6 shows a schematic representation of a simple ESD circuit arrangement according to the prior art.

Such an arrangement is shown schematically in FIG. 6. The intention is to protect the circuit part 2 of an integrated circuit from ESD pulses or EOS events which are present at a connection 1, for instance an I/O pad. For this purpose, an ESD protective element 33 is connected between the connection 1 and an earth line (GND) 5. Instead of the earth line 5, another supply voltage line, for instance a positive supply voltage VDD, can be chosen, and moreover a protective path between a positive supply voltage and earth can be considered by analogy. Below, only a protective path between an input or output and earth is considered explicitly. For the other stated possibilities, the following applies by analogy. The ESD protective element is a component which in normal operation of the circuit has blocking behaviour, but if a critical voltage $U_c$ such as occurs, for instance, in the case of ESD or EOS events is exceeded, has low resistance. The corresponding ESD/EOS pulses are thus diverted to earth, as indicated by the arrow 12. Examples of such components are Zener diodes or correspondingly wired MOS components.

In normal operation of the component, i.e. in the non-conducting state, such an ESD protective element 33 is usually only permitted for a specified voltage range. Operation outside this voltage range over a relatively long period is not allowed, for reliability reasons. For the arrangement shown in FIG. 6, this means a restriction of the permitted signal voltage range at the connection 1, and thus a restriction of the functionality of the circuit to be protected.

Furthermore, the permitted operating voltage of the components and thus also of the ESD protective elements falls with each new technology generation. On the other hand, the signal ranges of standard I/O interfaces such as PCI or USB are maintained over several generations. Thus, for instance, even in a 1.5 V CMOS technology, 3.3 V interfaces must be made available.

Figures 7A, 7B:
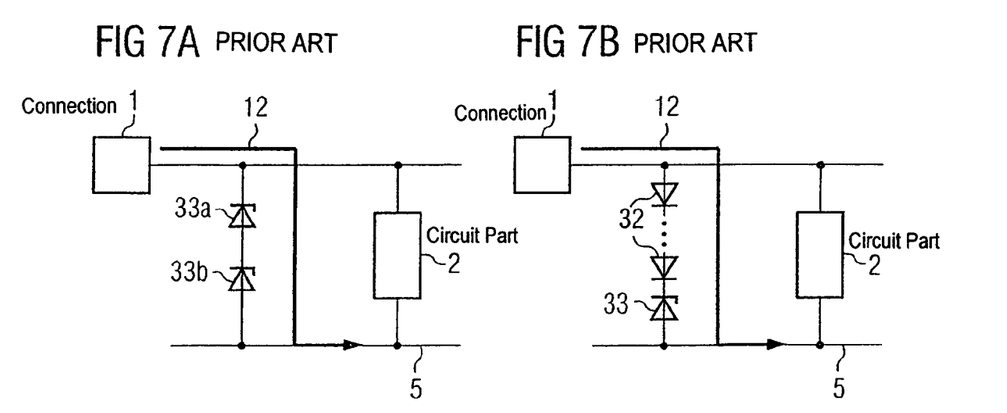
FIGS. 7A and 7B show ESD circuit arrangements with multiple protective elements according to the prior art.

One possibility for solving this problem is to connect multiple protective elements in series, to achieve a lower voltage drop at the individual element. Examples of this are shown in FIG. 7. FIG. 7A shows a series circuit of two ESD protective elements 33a and 33b, so that the voltage drop at each individual ESD protective element is reduced compared with the circuit shown in FIG. 6. In FIG. 7B, the intention is to achieve a reduction of the dropping voltage at the ESD protective element 33 through one or more diode cutoff voltages of diodes 32. The diodes which are used can be bipolar pn or CMOS diodes. Additionally, the concept which is presented below can be transferred to a series circuit with CMOS or bipolar transistors.

In the case of such approaches with individual elements connected in series, there is the problem that an effective division of the total voltage drop to the individual elements of the protective circuit can be guaranteed only with a defined current flow, for instance to set an operating point of the diodes 32 in the series circuit. For instance, in the case of the series circuit of diodes 32 with an NMOS-based protective element 33, the "natural" leakage current is typically only between 1 nA and 1 µA, resulting in a voltage drop of only a few 10 mV or 100 mV per diode threshold. Thus the voltage drop at the protective element 33 is only insignificantly reduced, so that there is a danger of damage or degradation of the protective element in normal operation of the circuit, i.e. in blocking mode of the ESD elements, for instance in the case of an NMOS-based protective element by endangering the gate oxide.

Another ESD protective arrangement, which can tolerate different operating voltages, for integrated circuits is known from U.S. Pat. No. 5,719,737. This protective arrangement is specially designed for protection of a power supply of the integrated circuit. The circuit arrangement which is disclosed there uses a voltage divider to reduce the voltage which drops at one ESD protective element.

SUMMARY

The object of this invention is to provide an ESD protective circuit arrangement for integrated circuits which tolerates even relatively high operating voltages, and in particular can be used for signal inputs or outputs of the circuit, and which can be implemented with simple means.

According to the invention, it is proposed that in parallel with an ESD protective element a current path which includes a circuit element which limits the current through this current path is connected. By means of this additional current path, the ESD protective element can be protected from damaging signal or supply voltages in normal operation of the IC, whereas the ESD protective effect of the ESD protective element continues without restriction.

Preferably, further protective elements are connected in series to this parallel circuit, for instance diodes. Because of the current path, these are flowed through by a small leakage current even in normal operation (in which the ESD protective element blocks the parallel circuit) of the integrated circuit, and thus have a defined voltage drop. In this way, the voltage drop at the ESD protective element of the parallel circuit can be reduced. Thus the potentials within the ESD protective circuit are defined by the additionally inserted leakage current path (or transverse current path).

In particular, by a circuit arrangement according to the invention, the permitted voltage range for an I/O circuit can be advantageously extended. The relatively small leakage current which flows via the current path is unproblematic in this case.

In particular, the current path can be in switchable form, so that it is activated only if a voltage which is intolerable for the ESD protective element is present at the corresponding input or output of the integrated circuit. For this purpose, an electronically controllable switching means such as a transistor, or a control circuit, which opens the current path as soon as a specified reference voltage which is present at component level (in the simplest case the positive supply voltage) is exceeded, can be provided.

BRIEF DESCRIPTION OF THE DRAWINGS

The invention is explained in more detail below, with reference to the attached drawings.

FIG. 1 shows an embodiment according to the invention, FIGS. 1A and 1B showing two possible alternatives of the embodiment.

DETAILED DESCRIPTION

Figure 1A:
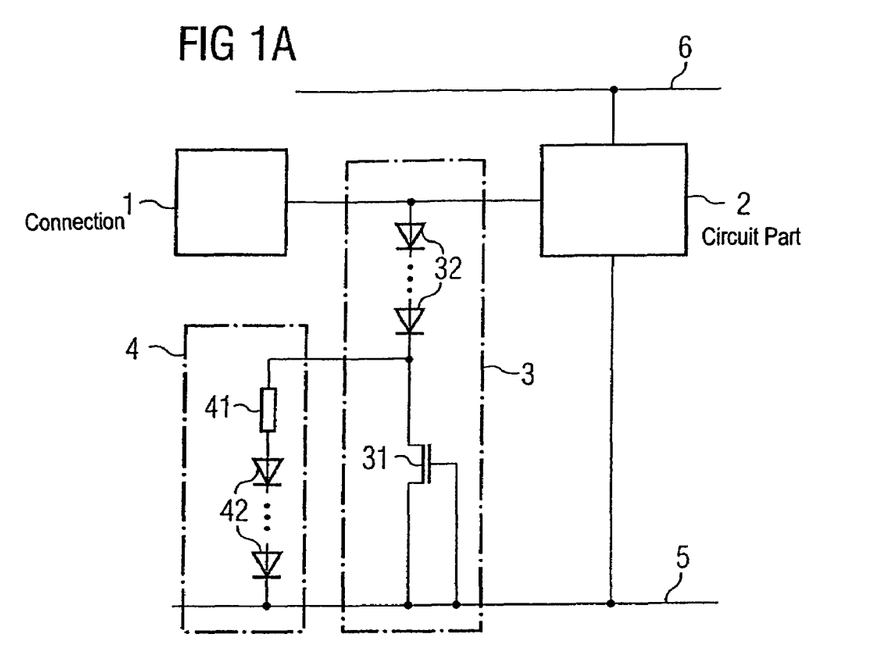

In FIG. 1A, an input/output (I/O) circuit part 2 of an integrated circuit is shown. It receives or transmits signals via an I/O connection 1 and is supplied with current via a positive supply voltage line 6 and an earth line 5. The I/O circuit part 2 includes elements, for instance sensitive gate oxides, which are to be protected from electrostatic discharges (ESD) or electrical over-stress (EOS) which are present at the I/O connection 1. The I/O circuit part 2 can communicate with the rest of the integrated circuit via further lines (not shown).

For protection from ESD or EOS events, between the I/O connection 1 and the earth line 5 an ESD protective path 3 is connected. In this embodiment, this protective path consists of an NMOS protective element 31 and one or more ESD diodes 32 which are connected to it in series, the diode-side end of the series circuit being connected to the I/O connection 1 and the NMOS-side end of the series circuit being connected to the earth line 5. The ESD diodes 32 can be implemented in a modern CMOS technology, e.g. by p+ diffusion in an n trough.

The dimensioning of the ESD diodes 32 must be such that on the one hand they have sufficient ESD strength to be able to conduct away an ESD current. On the other hand, the ESD diodes 32 must have sufficiently low high-current resistance (few ohms, ideally<1-2Ω) to generate as small a voltage drop as possible in the ESD case, and thus to ensure a best possible voltage limitation via the I/O circuit part 2 to be protected. The width of the p-n junction of such diodes will typically be of the order of magnitude of 100 μm.

The NMOS protective element has a permitted voltage range which can be below what is provided for the I/O connection. In parallel with the NMOS protective element, a current path 4, consisting of a resistor 41 which preferably has a resistance between 1 kΩ and 100 kΩ, and diodes 42, preferably diodes of minimum dimensions, is connected.

If the circuit is operated normally, so that the NMOS protective element blocks, a limited leakage current flows through the ESD diodes 32 and the current path 4. In this way a voltage which significantly reduces the dropping voltage at the NMOS protective element, and thus increases the voltage tolerance of the whole arrangement, drops in the ESD diodes 32.

In this and the following embodiments, in each case the ESD protective circuit arrangement is connected between an I/O connection and an earth line. Analogously, it can also be connected between an I/O connection and a (particularly positive) supply voltage, or, for instance, between a positive supply voltage and an earth line. This means that not only signal connections, but for instance also connections for power supply to the integrated circuit, can be provided with a circuit according to the invention as protection from ESD and EOS events, i.e. in general all connections of the integrated circuit. Moreover, the circuit arrangement is not limited to NMOS protective elements as in the embodiments, but can be applied to all ESD protective elements, particularly those which can only be operated in a restricted voltage range. Possible ESD protective elements are, for instance, PMOS protective elements, bipolar transistors, including parasitic bipolar transistors such as can occur, for instance, in the substructure of NMOS or PMOS components, or thyristors, e.g. so-called silicon controlled rectifiers (SCRs).

Figure 1B:
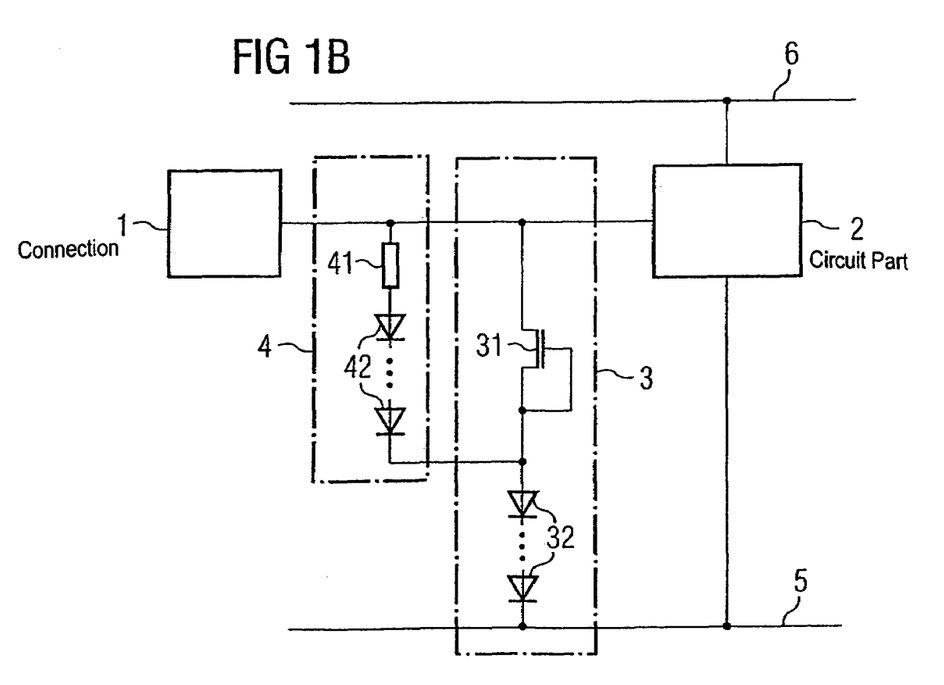

In FIG. 1B, a variant which differs from the embodiment shown in FIG. 1A in the reversed sequence of the NMOS protective element 31 and ESD diodes 32 is shown. In principle both arrangements are possible. The arrangement shown in FIG. 1A limits the voltage drop via all junctions of the NMOS protective element 32, whereas in the arrangement shown in FIG. 1B a parasitic diode which is often present in such protective elements, e.g. between drain and trough, is also actively used for ESD protection, since in this case the NMOS protective element is connected directly to the I/O connection 1. It should be noted that in practice the bulk of such NMOS components is also on earth.

For the following embodiments, in each case only the arrangement which is analogous to FIG. 1A is shown, but an arrangement which is analogous to FIG. 1B is also possible.

Figure 2A:
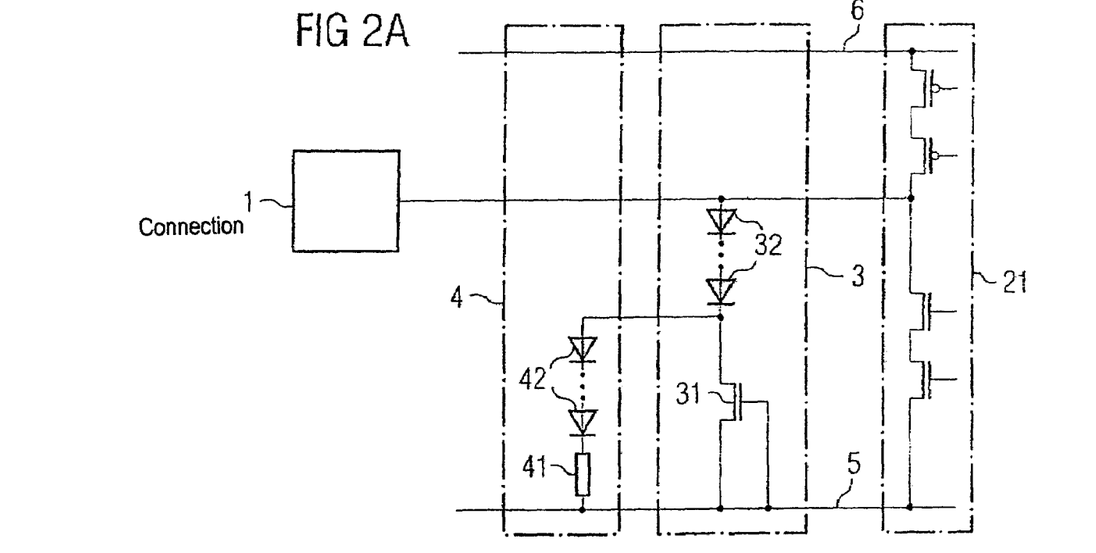
FIG. 2A shows a similar embodiment to that of FIG. 1A, on which circuit simulations of which the results are shown in FIGS. 2B and 2C were carried out.

In FIG. 2A, an embodiment which is analogous to that of FIG. 1A is shown, with the difference that instead of the I/O circuit part 2, only an I/O circuit part 21, including multiple MOS components, is shown. For this circuit arrangement, simulations to determine the voltage at the NMOS protective element 31 and of the leakage current which flows through the current path 4 depending on an input voltage which is present at the I/O connection were carried out. The resistance 41 was 10 kΩ.

Figure 2B:
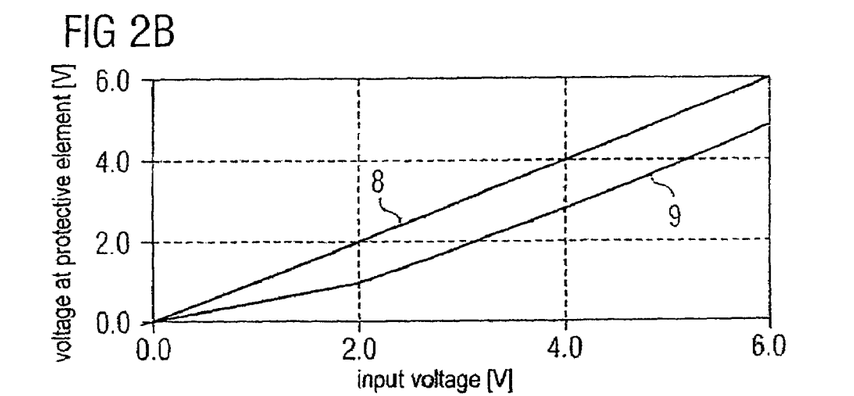

FIG. 2B shows the voltage drop at the NMOS protective element depending on the input voltage, without (curve 8) and with (curve 9) the presence of the current path 4. As can clearly be seen, in the case of input voltages greater than about 2 V, the voltage which is present with a leakage current path is reduced by about 1 V compared to the case without a leakage current path. This corresponds to the two diode thresholds of the ESD diodes 32.

Figure 2C:
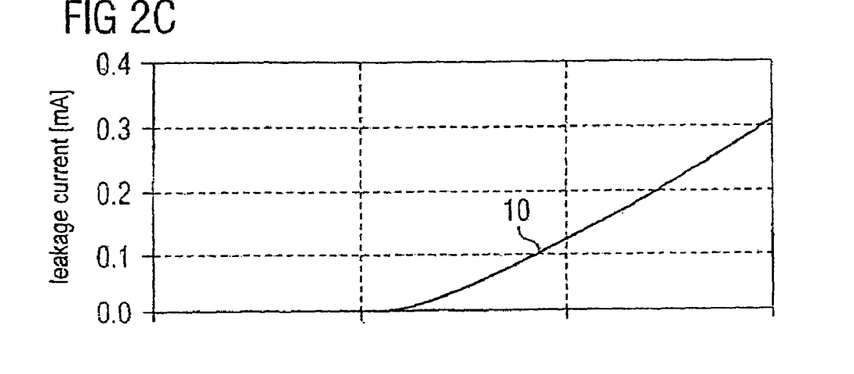

In FIG. 2C, the result of the simulation for the leakage current through the current path 4 depending on the input voltage is shown (curve 10). Because of the diode thresholds of the diodes 42, a significant leakage current, which in the investigated voltage range reaches values up to a few 100 μA, occurs only for voltages>2V. The magnitude of the leakage current can be optimised by optimising the resistance of the resistor 41 and the number of diodes 42.

Figure 3:
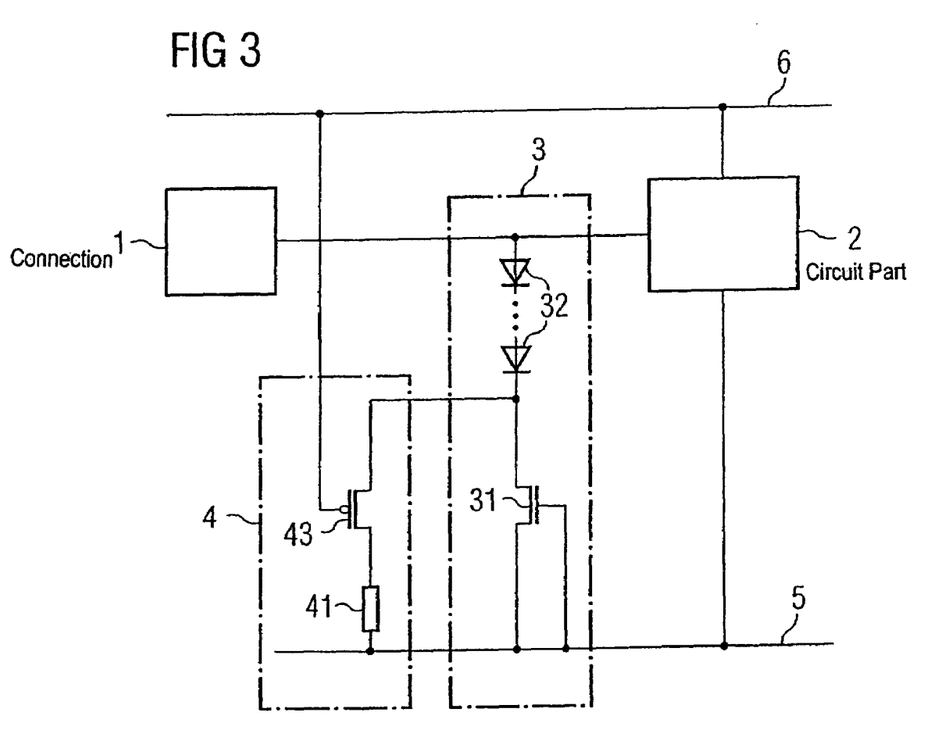
FIG. 3 shows a second embodiment according to the invention.

A further embodiment according to the invention is shown in FIG. 3. In comparison with FIG. 1A, only the current path 4 has been changed. The other parts of the circuit are unchanged.

The current path 4 in FIG. 3 consists of a resistor 41 and a PMOS component 43, preferably a component of minimum dimensions (minimal PMOS), which has a gate which is connected to the positive supply voltage line 6. This PMOS component 43 has the effect that a leakage current can flow via the current path only if the voltage at the I/O connection exceeds the positive supply voltage by a critical value, which is determined by the number of ESD diodes 32 and the PMOS cutoff voltage. Because of this circuit arrangement, the leakage current is only activated in a range in which a voltage drop which would be damaging for the NMOS protective element 31 would be present. With smaller voltages, the leakage current path is inactive and interfering leakage currents are suppressed.

Figure 4A:
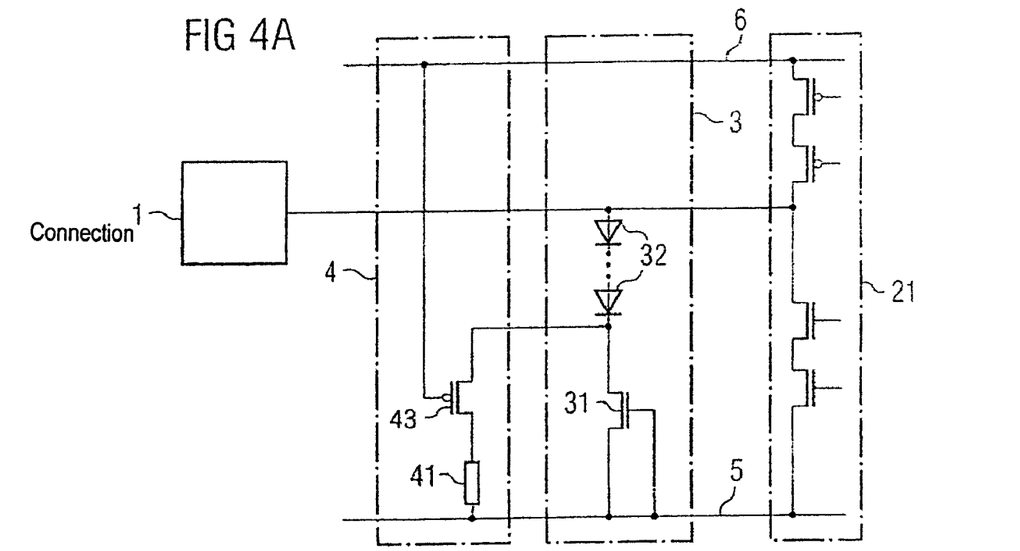
FIG. 4A shows a similar embodiment to that of FIG. 3, on which circuit simulations of which the results are shown in FIGS. 4B and 4C were carried out.

This behaviour was in turn demonstrated using a circuit simulation, which is shown in FIG. 4. FIG. 4A shows an embodiment according to the invention which is analogous to what is shown in FIG. 3. Instead of the circuit part 2, a circuit part 21, including multiple MOS components, is shown. The resistance 41 for the simulation was again 10 kΩ.

Figure 4B:
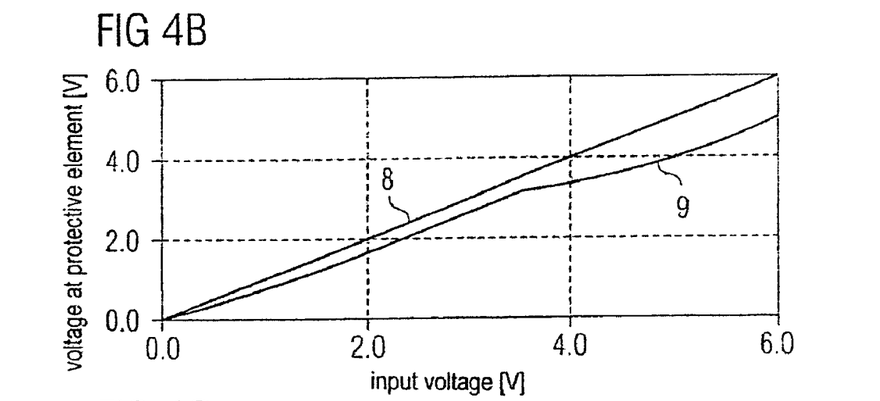
Figure 4C:
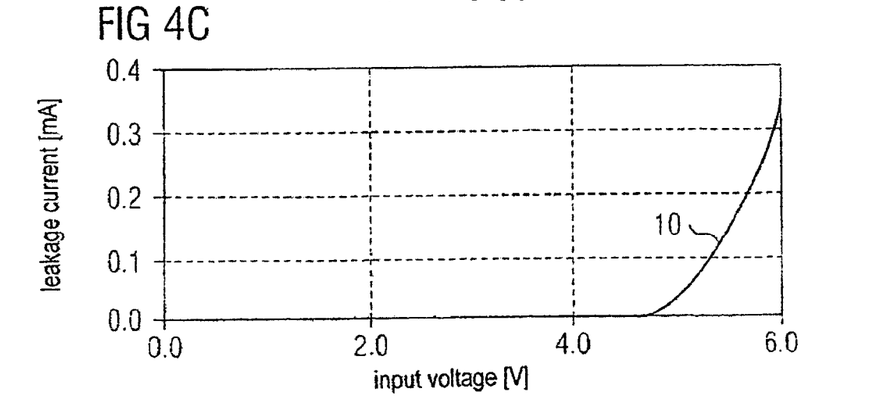

The representations in FIGS. 4B and 4C are analogous to those of FIGS. 2B and 2C, and show results of the simulation which was carried out on the circuit arrangement shown in FIG. 4A. In FIG. 4B, the voltage which is present at the NMOS protective element 31 is shown depending on the input voltage, without (curve 8) and with (curve 9) the presence of the leakage current path 4. From an input voltage of about 4 V, the voltage which is present at the NMOS protective element is reduced by about 1 V, corresponding to the diode thresholds of the two ESD diodes 32, so that here, in the case of the high, potentially damaging input voltages, a reduction of the voltage is ensured.

In FIG. 4C, the leakage current via the current path 4 depending on the input voltage is shown (curve 10). A noticeable leakage current begins here only for input voltages over 4 V, and up to an input voltage of 6 V the leakage current increases to about 7 µA, and is therefore significantly less than in the embodiment shown in FIG. 2. This shows that by such a control circuit with a PMOS component 43, the leakage current can be effectively reduced.

Figure 5A:
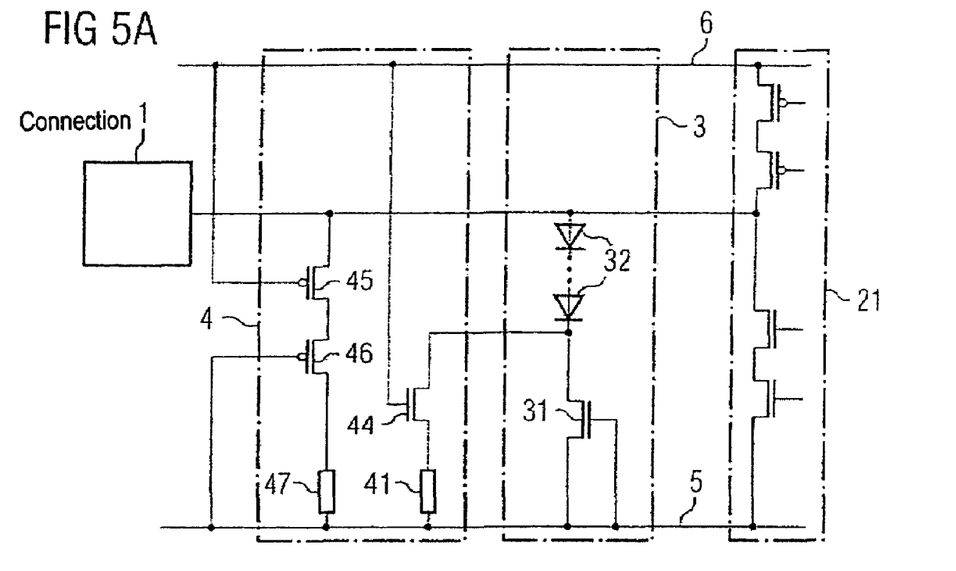
FIG. 5A shows a third embodiment according to the invention, on which circuit simulations of which the results are shown in FIGS. 5B and 5C were carried out.

In FIG. 5a, a third embodiment according to the invention is shown. Compared with the embodiments shown in FIGS. 2A and 4A, only the current path 4 has been changed, and the rest of the circuit arrangement is unchanged. In particular, compared with the circuit arrangement shown in FIG. 4A, there is now an additional control circuit, consisting of PMOS elements 45 and 46, for the NMOS transistor 44. To limit the leakage current, there is an additional resistor 47. To simulate this circuit, the values of the resistors 41 and 47 were each 10 kΩ.

Figure 5B:
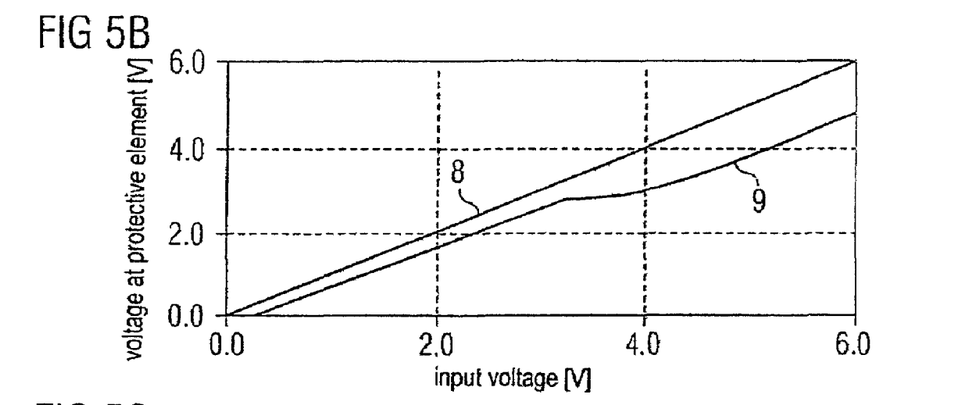
Figure 5C:
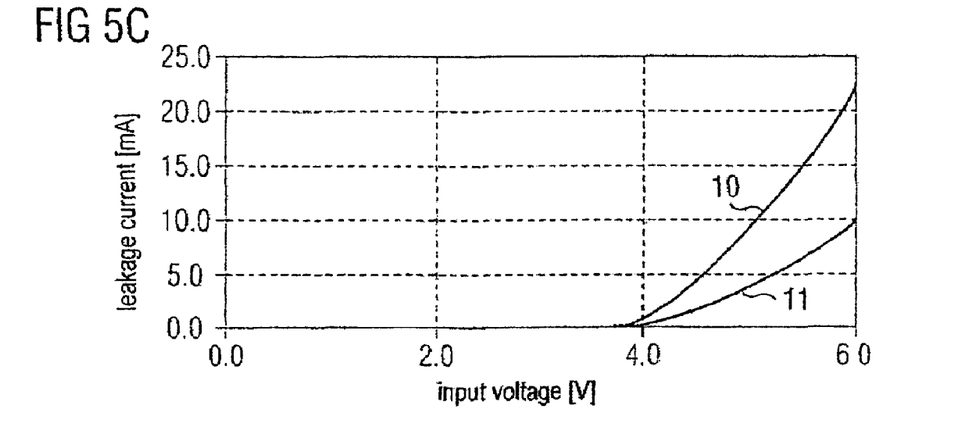

In FIG. 5B, the voltage drop at the NMOS protective element 31 depending on the input voltage at the connection 1 is shown. Curve 8 represents the voltage drop without a current path 4, and curve 9 represents the voltage drop with a current path 4. Because of the presence of the current path 4 with a two-stage control circuit, the voltage drop at the NMOS protective element 31 is effectively reduced compared with FIG. 4B even for input voltages less than 4 V, so that for instance with 4 V input voltage the voltage which drops at the NMOS protective element 31 is only about 3 V.

In FIG. 4C, both the leakage current which flows through the current path via the resistor 41 (curve 10) and the current which flows via the resistor 47 (curve 11) are shown depending on the input voltage. With an input voltage of 6 V, these currents are just 25 µA and about 10 µA respectively, and are thus somewhat greater than in the case of the circuit arrangement shown in FIG. 4. On the other hand, as shown above, the voltage drop at the NMOS protective element is reduced even with relatively small voltages.

Finally, it should be pointed out that—although the invention has previously been explained on the basis of preferred embodiments with ESD diodes 32 which are connected in series with the ESD protective element 31—in principle it is possible to achieve the object which was explained initially even without these ESD diodes, or with only one, or with more than two ESD diodes.

The invention claimed is:

1. A circuit to protect an integrated circuit from electrostatic discharges or electrical over-stress, the circuit arrangement comprising:
   a first protective element that permits an electrostatic discharge occurring at a connection of the integrated circuit to be conducted away to a supply voltage;
   a second protective element connected in series to the first protective element; and
   a current path containing a circuit element and that limits current through the current path, the current path being connected in parallel with the first protective element,
   wherein when the first protective element substantially blocks current flow, a limited current flows through the current path and the second protective element.

2. The circuit arrangement according to claim 1, wherein the circuit element includes a resistor.

3. The circuit arrangement according to claim 2, wherein the resistor has a resistance of at least 1 kΩ.

4. The circuit arrangement according to claim 1, wherein the current path includes a diode.

5. The circuit arrangement according to claim 1, wherein the current path can be switched on and off.

6. The circuit arrangement according to claim 5, wherein the current path is switched on or off by an electronically controllable switching means which is included in the current path.

7. The circuit arrangement according to claim 6, wherein the circuit arrangement includes a control circuit to control the electronically controllable switching means.

8. A circuit to protect an integrated circuit from electrostatic discharges or electrical over-stress, the circuit arrangement comprising:
   a first protective element that permits an electrostatic discharge occurring at a connection of the integrated circuit to be conducted away to a supply voltage;
   a second protective element connected in series to the first protective element;
   a current path containing a circuit element and that limits current through the first protective element connected in parallel with the first protective element,
   wherein when the first protective element has blocking behavior, a limited current flows through the current path and the second protective element;
   wherein the current path is switched on or off by an electronically controllable switching means which is included in the current path;
   wherein the circuit arrangement includes a control circuit to control the electronically controllable switching means; and
   wherein the control circuit comprises a first and a second transistor, the first transistor being connected between the connection of the integrated circuit and a control input of the electronically controllable switching means, and the second transistor being connected between the control input of the electronically controllable switching means and the supply voltage.

9. The circuit arrangement according to claim 5, wherein the current path is switched on if a voltage which is present at the connection of the integrated circuit exceeds a specified value.

10. The circuit arrangement according to claim 1, wherein the second protective element comprises a diode.

11. The circuit arrangement according to claim 1, wherein the first protective element comprises an NMOS-based or PMOS-based protective element, a bipolar transistor or a thyristor.

12. The circuit arrangement according to claim 1, wherein the second protective element is connected directly to the supply voltage.

13. The circuit arrangement according to claim 1, wherein the second protective element is connected directly to the connection of the integrated circuit.

14. An integrated circuit comprising a circuit arrangement according to claim 1.

15. A circuit to protect an integrated circuit from electrostatic discharges or electrical over-stress, the circuit arrangement comprising:
a first and second protective element connected in series between a connection of the integrated circuit and a supply voltage, the first protective element providing a current path only when a predetermined voltage between the connection of the integrated circuit and the supply voltage is exceeded;
a current path containing a circuit element, the current path connected in parallel with the first protective element, the circuit element limiting current through the current path; and
wherein when the first protective element substantially blocks current flow, a limited current flows through the current path and the second protective element.

16. The circuit arrangement according to claim 15, wherein the first protective element comprises a three or more terminal device that regulates current therethrough.

17. The circuit arrangement according to claim 15, wherein the second protective element is connected directly to the supply voltage.

18. The circuit arrangement according to claim 15, wherein the second protective element is connected directly to the connection of the integrated circuit.

19. The circuit arrangement according to claim 15, wherein the circuit element comprises a resistor.

20. The circuit arrangement according to claim 19, wherein the circuit element further comprises a diode in series with the resistor.

21. The circuit arrangement according to claim 19, wherein the circuit element further comprises a first device that contains at least three terminals, regulates current therethrough, and is in series with the resistor.

22. A circuit to protect an integrated circuit from electrostatic discharges or electrical over-stress, the circuit arrangement comprising:
a first and second protective element connected in series between a connection of the integrated circuit and a supply voltage, the first protective element providing a current path only when a predetermined voltage between the connection of the integrated circuit and the supply voltage is exceeded; and
a current path containing a circuit element, the current path connected in parallel with the first protective element and limiting current through the first protective element, wherein the circuit element comprises a resistor, and wherein the circuit element further comprises a first device that contains at least three terminals, regulates current therethrough, and is in series with the resistor; and
a path between the connection of the integrated circuit and the supply voltage in parallel with the first and second protective elements, the path having a second and third devices that each contain at least three terminals, regulate current therethrough, and are in series with another resistor, a control terminal of the second device connected to the supply voltage and a control terminal of the third device connected to a different supply voltage.

23. The circuit arrangement according to claim 22, wherein a control terminal of the first device is connected to the different supply voltage.

24. The circuit arrangement according to claim 15, wherein the second protective element comprises a plurality of diodes.

25. A circuit to protect an integrated circuit from electrostatic discharges or electrical over-stress, the circuit arrangement comprising:
a first and second protective element connected in series between a connection of the integrated circuit and a supply voltage, the first protective element providing a current path only when a predetermined voltage between the connection of the integrated circuit and the supply voltage is exceeded, the first protective element having at least three terminals and regulating current therethrough, the second protective device comprising a plurality of diodes;
a current path containing a resistor, the current path connected in parallel with the first protective element; and
wherein when the first protective element substantially blocks current flow, a limited current flows through the current path and the second protective element.

26. The circuit arrangement according to claim 7, wherein the control circuit comprises a first and a second transistor, the first transistor being connected between the connection of the integrated circuit and a control input of the electronically controllable switching means, and the second transistor being connected between the control input of the electronically controllable switching means and the supply voltage.

27. The circuit arrangement according to claim 21, further comprising a path between the connection of the integrated circuit and the supply voltage in parallel with the first and second protective elements, the path having second and third devices that each contain at least three terminals, regulate current therethrough, and are in series with another resistor, a control terminal of the second device connected to the supply voltage and a control terminal of the third device connected to a different supply voltage.

28. The circuit arrangement according to claim 27, wherein a control terminal of the first device is connected to the different supply voltage.

29. The circuit arrangement according to claim 1, wherein the circuit path is configured to limit a voltage drop across the first protective element by allowing current flow through the current path when a normal operating voltage is applied to the connection.

* * * * *